United States Patent [19]
Gulsen

[11] Patent Number: 5,727,211
[45] Date of Patent: Mar. 10, 1998

[54] SYSTEM AND METHOD FOR FAST CONTEXT SWITCHING BETWEEN TASKS

[75] Inventor: Denis Gulsen, Mountain View, Calif.

[73] Assignee: Chromatic Research, Inc., Mountain View, Calif.

[21] Appl. No.: 556,416

[22] Filed: Nov. 9, 1995

[51] Int. Cl.$^6$ ........................................................ G06F 9/46
[52] U.S. Cl. ........................... 395/678; 395/569; 364/230; 364/230.1; 364/230.2
[58] Field of Search ........................ 395/674, 678, 395/569; 364/230, 230.1, 230.2

[56] References Cited

PUBLICATIONS

Research Disclosure, No. 318, "Register Mask Based Microprocessor Context Switching", pp. 825–826, 1 Oct. 1990, XP000148672.

IBM Technical Disclosure Bulletin, vol. 33, No. 3B, 1 Aug. 1990, "Technique to Improve Context Switching Performance in a CPU", pp. 472–473, XP000124425.

Sudarshan K. Dhall and C.L. Liu, "On a Real–Time Scheduling Problem", Operations Research, vol. 26, No. 1, Jan–Feb. 1978, pp. 127–140.

H.M. Abdel–Wahab and T. Kameda,"Scheduling to Minimize Cumulative Cost Subject to Series–Parallel Precedence Constrains", Operations Research, vol. 26, No.1, Jan–Feb. 1978, p. 141.

C.L. Lou and James W. Layland, "Scheduling Algorithms for Multiprogramming in a Hard–Real–Time Environment", Journal of the Association for Computing Machinery, vol. 20, No. 1, Jan. 1978, pp. 46–61.

J.F. Bortolotti, P. Vernard, and E. Bouchet, "RTKM: A Real–Time Microkernel", Dr. Dobb's Journal, May 1994, pp. 70, 72, 74, 76, 105–106.

David Shear, "Three DSP RTOSs are Ready to Merge with Windows", EDN–Technology Update, Jun. 1994, pp. 2929–30, 32 and 34.

*Primary Examiner*—Kevin A. Kriess
*Assistant Examiner*—Majid A. Banankhah
*Attorney, Agent, or Firm*—Skjerven, Morrill, MacPherson, Franklin & Friel LLP; Stephen A. Terrille

[57] ABSTRACT

A system and method for fast context switching between tasks by tracking task utilization of shared system resources and optimizing swapping the shared system resources to backing store by computing the difference between the current task's utilization of the system resources and the incoming task's utilization of the shared system resources and only swapping to backing store the difference between the current task's utilization, the available system resources, and the incoming task's needs.

9 Claims, 6 Drawing Sheets

SYSTEM AND METHOD FOR FAST CONTEXT SWITCHING BETWEEN TASKS

RELATED APPLICATIONS

This application is related to the U.S. patent application Ser. No. 08/541,565 filed Oct. 10, 1993, entitled: "MULTIMEDIA ENGINE INCLUDING PROCESSOR USING VARIABLE LENGTH INSTRUCTIONS" to James T. Battle, Andy C. Hung, and Stephen C. Purcell filed Nov. 10, 1995, the contents of which are hereby incorporated by reference in their entirety.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

FIELD OF THE INVENTION

The present invention relates to operating systems, and more particularly to context switching between tasks in real time operating systems.

BACKGROUND OF THE INVENTION

Real time operating systems have been in use in a variety of embedded systems for many years. These systems were often special purpose such as supporting embedded algorithms in military devices such as acquiring and tracking targets, or managing large switching systems. Real time operating systems all share similar requirements. First, the hardware available for processing the real time operating system is physically constrained, i.e., limited physical memory and backing store. Second and more challenging, real time operating systems are all time constrained, i.e., each software task of the operating system must operate in lock step time precision or the system as a whole may fail to perform correctly.

A digital signal processing system is an example of a system that requires real time responsiveness. Using digital signal processors to manage sound, video, or graphics requires real time responsiveness to ensure that the audio stream remains constant enough for the human ear, that the image on video or a display device is properly refreshed and updated, or to manage transmission protocols which have built in timeouts such as fax and digital tone modulated frequency. As digital signal processors have become more cost effective, their use on personal computers has increased.

Several DOS/Windows interfaces to real time operating systems on digital signal processors have been developed. These include the real time operating system available from AT&T under the trade designation VCOS which operates on AT&T's digital signal processor 3200 family of digital signal processors; the real time operating system available from IBM under the trade designation Mwave which operates on IBM's Mwave 16-bit digital signal processors, and the real time operating system available from Spectron Microsystems under the trade designation Spox which operates on Analog Devices' 2100 digital signal processor, Motorola's 56000 and 96000 families of digital signal processors and Texas Instrument's TMS320C3X and C4X families of digital signal processors. All of these systems provide various scheduling algorithms and system services, each of which is designed to ensure that each task always meets its start and completion time deadlines. Each of these systems attempts to manage the time criticality by checking whether there are enough resources available for the task to execute. More specifically, the resource requirements are specified by the task to the real time operating system and the real time operating system refuses to execute the new task if there are not enough resources to execute the task. Additionally, each of these systems provides a scheduling algorithm designed to ensure that real-time tasks receive enough processing time to complete their tasks.

Research in the area of real time scheduling has focused on providing a bounded worst case time within which the scheduling algorithm must operate. Scheduling algorithm development has focused on predictability, especially in the case of degenerative conditions. Examples of this operations research include "On a Real-Time Scheduling Problem", Operations Research Vol. 26, No.1 Jan-Feb. 1978, Dhall, Liu (hereafter Dhall et. al). Other research has focused on optimal scheduling based on processor utilization such as "Scheduling to Minimize Maximum Cumulative Cost Subject to Series-Parallel Precedence Constraints", Operations Research Vol. 26, No. 1 Jan-Feb. 1978 H. M. Abdel-Wahab, R. Kameda (hereafter Abdel-Wahab et. al).

An area that has not been widely considered for reducing overall scheduling time is context switching. Previous context switching methods in other operating systems illustrate some of the types of context switching algorithms currently in use. In the Cray Computer proprietary operating system, known under the trade designation COS, context switches involve large vector registers which are swapped in their entirety. This is because in the Cray operating system, jobs are primarily run in batch mode and are scheduled to execute for relatively long periods of time. In other systems, context switching manages only a few simple registers such as the program counter, stack pointer, and data pointer(s). An example of such a system is a real time operating system known under the trade designation VRTX available from Hunter systems for the Intel X86 architectures. Other systems, such as DOS, rely on voluntary task cooperation.

In present real-time systems, the real time operating system may be managing proportionately large amounts of resources which need to be swapped at each task cycle. Thus, improvements in context switching will benefit the overall performance of the system and ensure that the minimum latency requirements necessary for real-time operation can be met.

SUMMARY OF THE INVENTION

The present invention provides a system and method for fast context switching between one or more operating system tasks running in a processing system. In the processing system of the present invention, tasks store information in a common system resource. This shared resource contains information which may need to be stored in the system's backing store when the current task is disengaged from the processor in favor of an incoming task. A system routine is responsible for determining which parts of the shared system resource must be saved to backing store in order to ensure that the incoming task has enough of the shared system resource allocatable to the incoming task according to the incoming tasks system resource utilization requirements. The system routine compares the current tasks shared system resource utilization requirements to the incoming tasks utilization requirements and swaps the minimum amount of current task information to the system backing store. In real time and time critical systems task context switching must be both as fast as possible and as predictable as possible to ensure maximum latencies are not exceeded. To optimize context switching, the invention described here swaps out only the portion of the current task's context that would be overwritten by the incoming task. Thus, if the next context switch returns to the original task only that portion which has been swapped out needs to be reloaded. In addition, tasks may notify the operating system that a portion of the system resource is being used to store frequently used constants. This enables the invention to flag that portion of the register file as a save once location. That is, constants are only saved on the first context switch location. When the task is next reloaded constants are restored from the save area.

An advantage of the invention is that system context switching time is reduced. Another advantage of the invention is that tasks are freed from the requirement of saving and restoring their own context. A third advantage is that context restoration time is minimized when the task being restored still has information resident in the system resource. Other advantages are apparent from the provided details of the invention.

The system of the present invention includes a data processing system with a backing store, a shared system resource, e.g., a register file, in which task state information, procedure call information, an instruction cache, and a data cache reside. Tasks are allocated a data cache chunk of the register file based on a task's request at initialization by the resource manager component of the processing system. Information about the task's resource utilization is contained in a map data structure. After a task begins executing it may request to change the size of the register file utilization and this information is updated in the map.

The task register file usage is a large shared memory resource that may contain task specific context that must be preserved on task swaps. Therefore context switch time is directly proportional to the size of the task data cache. To facilitate fast context switching the present invention creates a map data structure to maintain current task shared resource utilization. When an incoming task is ready for processing, a system routine loads the current task and the incoming task's resource utilization into temporary storage. The system routine then accesses the map structure to determine which system resources are available, i.e. currently unused, and then compares the incoming task's needs with available resources and the current task's actual usage.

The system routine minimizes swapping current task information to backing store, thereby reducing the time necessary to restore the current task should it be the task loaded once the incoming task completes.

A further refinement of the present invention allows the task to specify that the information stored in the system resource is read only information. Therefore the system routine only swaps the information to backing store the first time a task is disengaged from the processor.

In the present invention, the shared system resource may be fast on-chip memory e.g. a register file. Further the system routine can take advantage of processor instructions that access and copy information out of the register file more than one register at a time.

The present invention presents a new system and method for managing task shared system resources via a new optimized context switching method. Although the present invention is directed to real time operating systems, any general purpose operating system will benefit from the improvements in reduced context switch time and overhead.

DETAILED DESCRIPTION

The invention will be better understood by referring to the figures. To provide consistency, the following terms are defined.

DEFINITIONS

Backing Store: A reserved location in any of physical memory, disk drive, or off-line storage used by the operating system to save task context state when the task is not the currently executing task.

Context Switching: The act of changing out one task currently executing on a processor for another task.

Dword: 72-bit double words from which the register file is constructed.

Icache: Instruction Cache

ISR: Interrupt Service Routine

Preempting: The act of stopping the currently active task in order to run a task with a higher priority. The operating system is responsible for moving all the necessary components, for example the current state of the currently active task, and copy these components to a save location.

Register file: A set of registers, each individually addressable, capable of being programmed as special purpose registers, optionally having their own hardware access lines independent of general use memory.

Swapping: The act of moving data from one location or physical device to another location or device.

Task: A program capable of executing on a processor.

Task Context State: The information associated with a task that must be preserved when the task is not currently executing on a processor.

Thunking: Thunking is the process by which 16-bit 80×86 code modifies certain process calling sequences to allow it call 32-bit code. It is implemented in software, and mainly involves reconstructing part of the stack for parameter passing and return.

Figure 1:
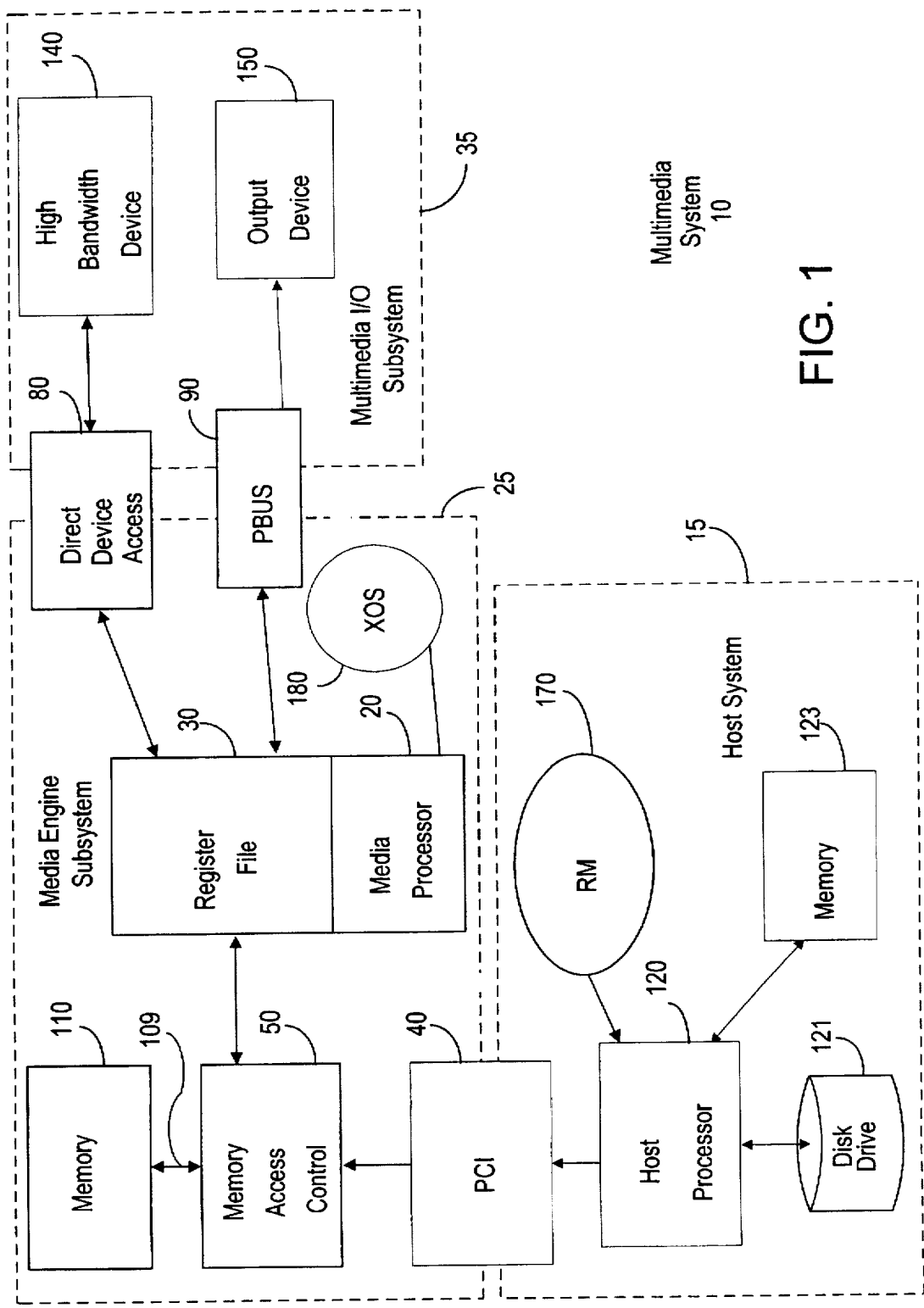
FIG. 1 is a block diagram of a processing system utilizing the media engine multimedia system in accordance with the present invention.

Virtualized Device Driver: A set of functions that execute at the host operating system's most privileged layer. These functions are used as extensions of the host operating system, and are allowed to physically address memory and to service host processor interrupts, exceptions, and faults Referring now to FIG. 1, a block diagram of an embodiment of a multimedia system 10 in accordance with the present invention is shown. Multimedia system 10, is a complete multimedia processing system. It includes host system 15, media engine subsystem 25, and input/output and multimedia (I/O) subsystem 35. Multimedia system 10 also includes an operating system which includes resource manager 170 and the real time operating system, XOS 180; the operating system interacts with, manages, and controls the various elements of multimedia system 10. More specifically, resource manager 170 controls static resource allocation and I/O bandwidth allocation of various components in media engine subsystem 25, such as memory 110 allocation, media processor 20 processor cycles, and I/O bandwidth to memory 110 through memory bus 109. XOS 180 is the real time operating system that manages the tasks that run on media processor 20. XOS 180 provides support functions for media processor 20 tasks such as interrupt processing, context switching, and subroutine calling.

Host system 15 includes host processor 120, disk drive 121, and memory 123. Host processor 120 is coupled to disk drive 121, and memory 123. Host processor 120 executes the resource manager 170. In the preferred embodiment, host processor 120 conforms to the Intel ×86 architecture, but those skilled in the art will recognize that the host processor could be adapted to other architectures such as the PowerPC™ architecture, and other processor architectures.

Media engine subsystem 25 is connected to host system 15 through PCI bus 40. Media engine subsystem 25 contains a memory 110 which is accessed by media processor 20 through memory bus 109, which is controlled by memory control circuit 50. PCI bus 40 is an industry standard bus that couples memory controller 50 with host processor 120 of host system 15. Memory controller 50 controls the access to memory 110 and mitigates access from Media processor 20, and host processor 120 over PCI bus 40. Memory 110 is a dynamic memory from which XOS 180 executes. XOS 180 and resource manager 170 also use memory 110 to transfer data from devices and to store and access communication subsystems implemented between XOS 180 and resource manager 170. In the preferred embodiment, memory 110 is dynamic memory, a Rambus DRAM, but those skilled in the art will recognize that other types of memory such as flash memory or static memory would operate equally well.

Media engine subsystem 25 also includes media processor 20 and register file 30. Media processor 20 is coupled to register file 30. Register file 30 is coupled to memory controller 50 which facilitates transfer of data from memory 110 into register file 30. Register file 30 is also coupled to direct device access control circuit 80 and peripheral bus 90.

Media processor 20 is a vector processing unit on which XOS 180 executes and from which XOS 180 controls the operation of tasks running on the media processor 20. XOS 180 manages task use of the register file 30, state transitions for XOS 180 tasks, and interrupt service routine instantiation.

Register file 30, is, e.g., a static RAM, and includes a plurality of individually addressable units,. Each addressable unit is, e.g., a 72 bit Dword. Software and hardware are coupled to register file 30 for, e.g., instruction caching and storing instruction operand and result data. Register file 30 provides a buffer for other hardware functions such as peripheral bus control 90, emulation register control, and direct device access 80 and is coupled to each of peripheral bus control 90, and direct device access 80. The buffer of register file 30 can be used in a variety of programmatic ways such as first in/first out (FIFO) queue, random access, or accessed via memory mapping or other common access techniques.

Multimedia I/O subsystem 35 contains a plurality of devices for sending and receiving input and output. Multimedia I/O subsystem includes direct device access 80, high bandwidth device 140, Pbus 90, and output device 150. In the present embodiment, direct device access 80 is a buffer coupled to register file 30 to which high bandwidth devices 140 may be attached. Direct device access 80 is coupled to and allows high bandwidth device 140 to send and receive data directly to or from a portion of the register file. High bandwidth devices 140 may be any of a variety of devices including special purpose optical devices, such as cameras, or recording devices, or display devices.

Pbus 90 is a peripheral bus used to drive a variety external output devices 150. Pbus 90 is coupled to media processor 20, to register file 30 and memory 110 and to output device 150. Output devices 150 could be devices such as audio devices, fax modems, or other devices. Pbus 90 uses part of the register file 30 as a FIFO for transferring data to and from memory 110.

Figure 2:
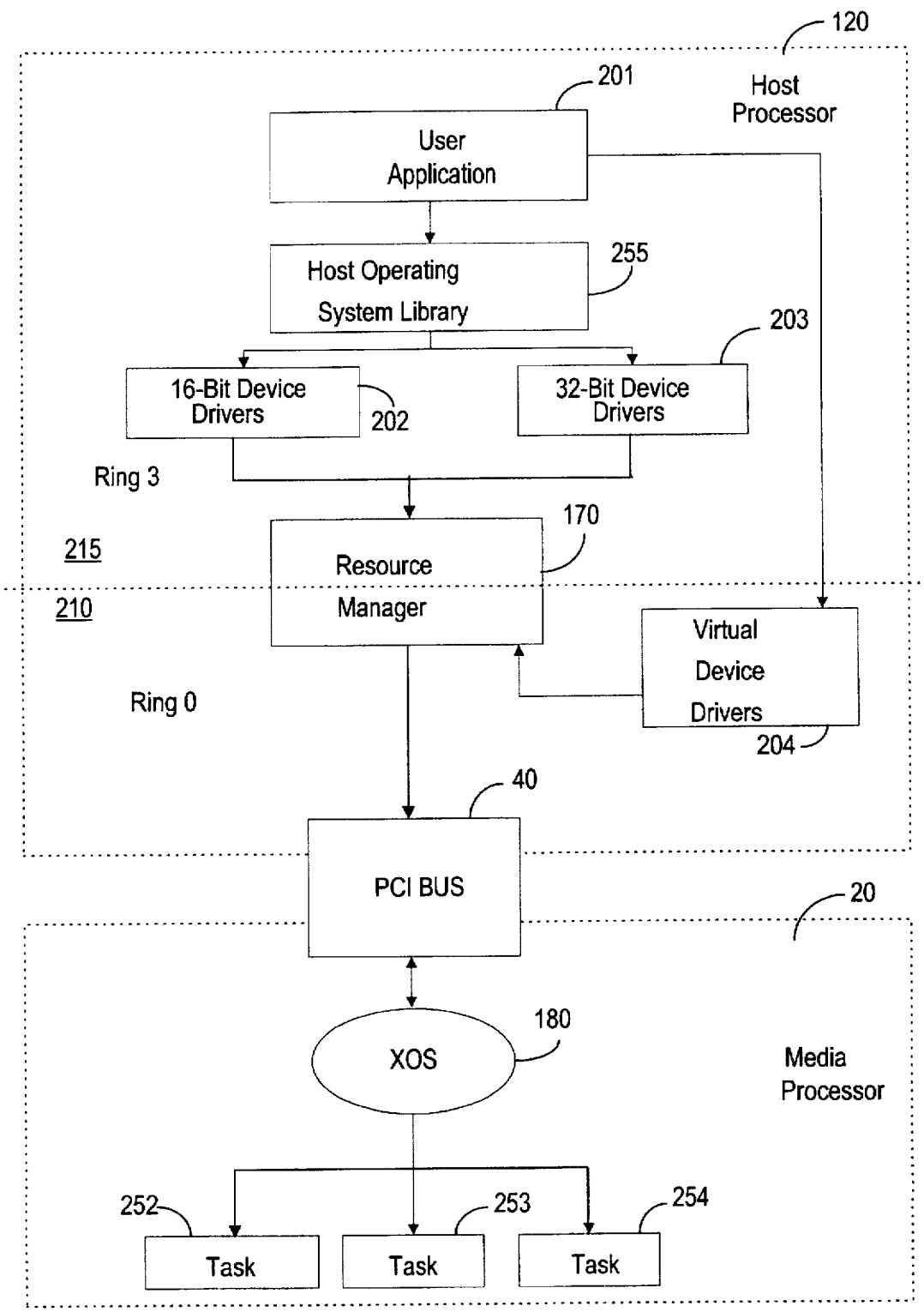
FIG. 2 is a block diagram of the system software organization of the multimedia system of FIG. 1.

FIG. 2 is a block diagram showing how XOS 180, resource manager 170, media processor 20 and host processor 120 interact when multimedia services are requested. FIG. 2 includes user application 201 running on host processor 120. Host operating system library 255 connecting user application 201 and devices drivers 202-204 all executing on host processor 120. Resource manager 170 running on host processor 120 residing in ring 3, 215 and ring O, 210 and communicating with PCI bus 40. XOS 180 running on media processor 20, communicating with PCI bus 40 and managing tasks 252-254. In the preferred embodiment, host processor 120 is an x86 processor running the Windows™ or the MS-DOS® operating system.

To activate media processor 20, user application 201 running on host processor 120 makes a call to any of device drivers 202, 203, or 204. Device drivers 202, 203 or 204 then call resource manager 170, running on host processor 120. If a XOS 180 task does not already exist to support user application 201, resource manager 170 creates a task to run on XOS 180, such as tasks 252-254. If a task already exists, then resource manager 170 passes the necessary information to the appropriate XOS 180 task through PCI Bus 40.

In the preferred embodiment, host processor 120 provides Ring 0 protection layer 210 and Ring 3 protection layer 215. Ring 0 software includes Virtual Device Drivers 204, (VDDs), such as a virtualized DMA controller or virtualized VGA controller. Ring 3 drivers 202 and 203 run on host processor 120. resource manager 170 consists of software running both in Ring 0 and Ring 3. XOS 180 and tasks 252-254 run on the media processor 20.

Figure 3:
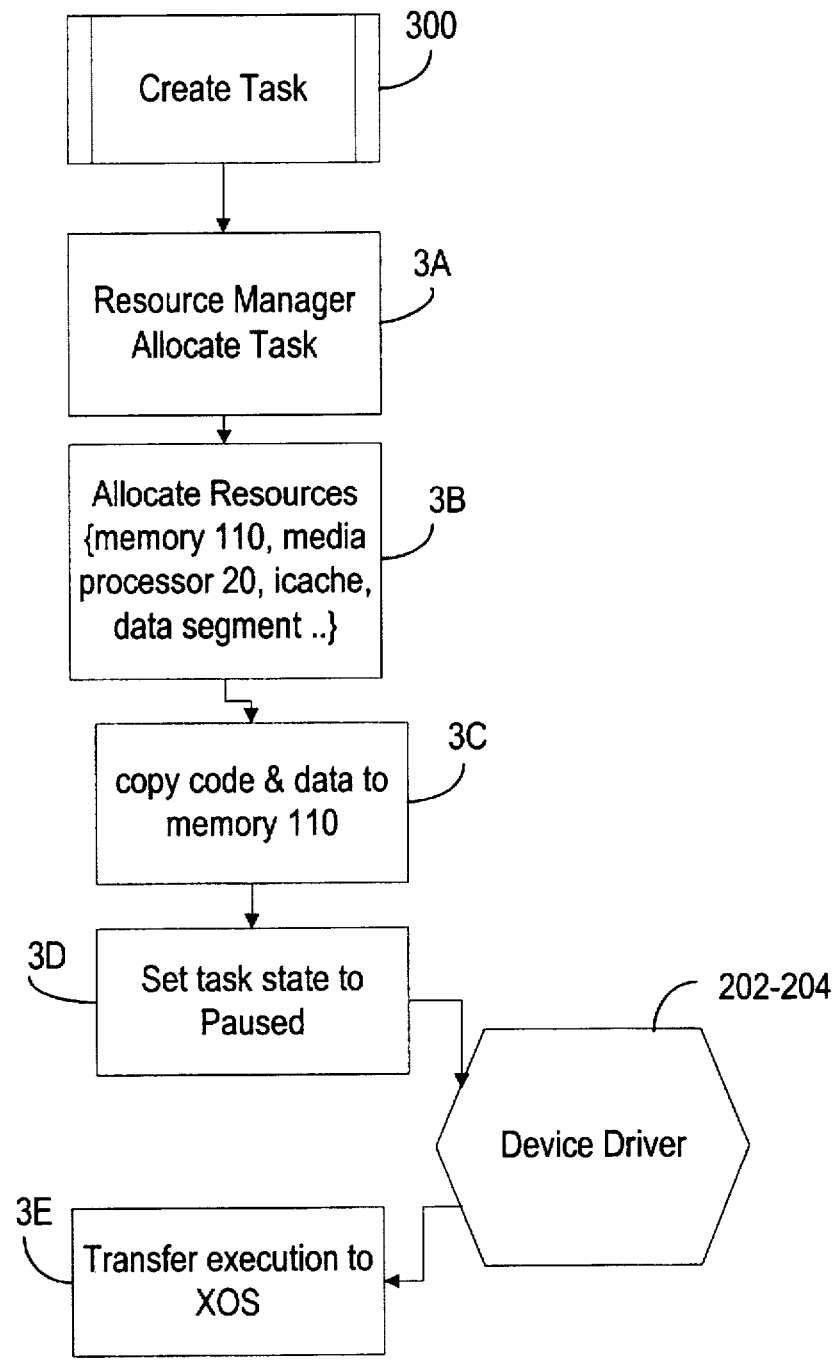
FIG. 3 is a flowchart of the functions associated with creating a task through the software of the multimedia system of FIG. 2.

FIG. 3 depicts steps for allocating a task such as tasks 252-254 through resource manager 170 and activating it through XOS 180 on the media processor 20. Device drivers 202-204, running on host processor 120, determine when the task gains access to media engine 20, by activating it through resource manager 170.

In step 3A, resource manager 170 allocates a task. Allocating a task requires creating a data structure and initializing it. Resource manager 170 represents XOS 180 tasks with a C++ class, which in the present embodiment is defined as the following.

TABLE 1

RMThreadAttr

```
struct RMThreadAttr : RMNodeAttr
{
    RMThreadAttr ( );
    DWORD    fPriority;       // the priority for this object (only
    used by tasks), where 0 is the lowest.
    DWORD    fPerfLevel;      // the initial "performace" level
    (only used by tasks)
    DWORD    fSize;           // used for allocating objects that
    do not have an image file
    VSPWord  fDeadline;
    DWORD    fSignalMask;
    DWORD    fSMEMMask;
    DWORD    fConstantMask;
    DWORD    fICacheMode;
    DWORD    fSlack;
    DWORD    fReserved1;
    DWORD    fReserved2;
};
RMThread : public RMResourceOwner : public RMObject
```

In step 3B, resource manager 170 which is responsible for static resource management and allocation, allocates resources such as memory 110, media engine 20 utilization, and I/O bandwidth. Resource manager 170 also sets the size of the data and icache areas when it creates a task. Resource allocation is handled by the RMThread method Allocate.

The RMThread class methods create, initialize, activate, and terminate a resource manager 170 task. An object of this class directly represents a single task to XOS 180.

The RMThread class contains at least the following members:

| | |
|---|---|
| Allocate | Loads resources owned by the task onto the media engine. |
| SetContextData | Sets the task's context data in register file before the task executes |
| Activate | Activates the task |
| Pause | Pauses the task |

Resource manager 170 allocates a task's memory 110 code segment when it creates the task. Resource manager 170 and XOS 180 support more that one code segment per task. When it creates a task, resource manager 170 allocates the task's memory 110 data space. A task may own multiple memory 110 data segments and may switch between them by calling xosSetDataSegment (). Only resource manager 170 can increase a task's allocated memory 110 resources. The task must signal the host, since there are no malloc () or free () functions available through XOS-only code. Resource manager 170 dynamically relocates memory 110 data blocks while a task is active. Resource manager 170 guarantees synchronization by temporarily blocking the task while relocating the task's data segment.

During a task's creation, the task's memory 110 data space can be initialized with values specified by the programmer.

TABLE 2

Allocate Task

RMThread::Allocate
virtual VSPError Allocate (void)
Effects:   Loads resources owned by the task onto the media engine.
           resource manager 170 requires that RMThread::Allocate( ) is

TABLE 2-continued

Allocate Task

|  |  |
|---|---|
|  | called before resources are downloaded to the media engine. |
| Modifies: | Alters memory 110 resource allocation, if enough resources are available. |
| Returns: | Produces an error if collected resources are not fully linked or if there is not enough resources to complete the allocation. |

Next in step 3C, resource manager 170 copies the code image for the task to memory 110. resource manager 170 links and downloads code into memory 110 blocks. Resource manager 170 may dynamically relocate memory 110 code blocks while a task is active. Code and data are copied to memory 110 over the PCI bus.

In step 3D, resource manager 170 places the task in a non-scheduled, "paused" state until its initialization is finished. When the task is ready to run, resource manager 170 changes the task state to "active" and the task is scheduled for processing. After allocating space for a task, resource manager 170 can asynchronously pause a task at anytime, rendering it inactive, and can reactivate the task later.

In step 3E XOS 180 loads the task to run on the media processor. Each XOS 180 task has one entry point that the kernel calls when the task is initially activated by resource manager 170. The task's entry point is specified when the task is created by resource manager 170. The entry point's address is a memory 110 location executing from icache.

For each task, XOS 180 controls which memory 110 data or code segments the task currently uses. Two special purpose registers on the media processor point to the task data segment and task instruction segment.

Figure 4:
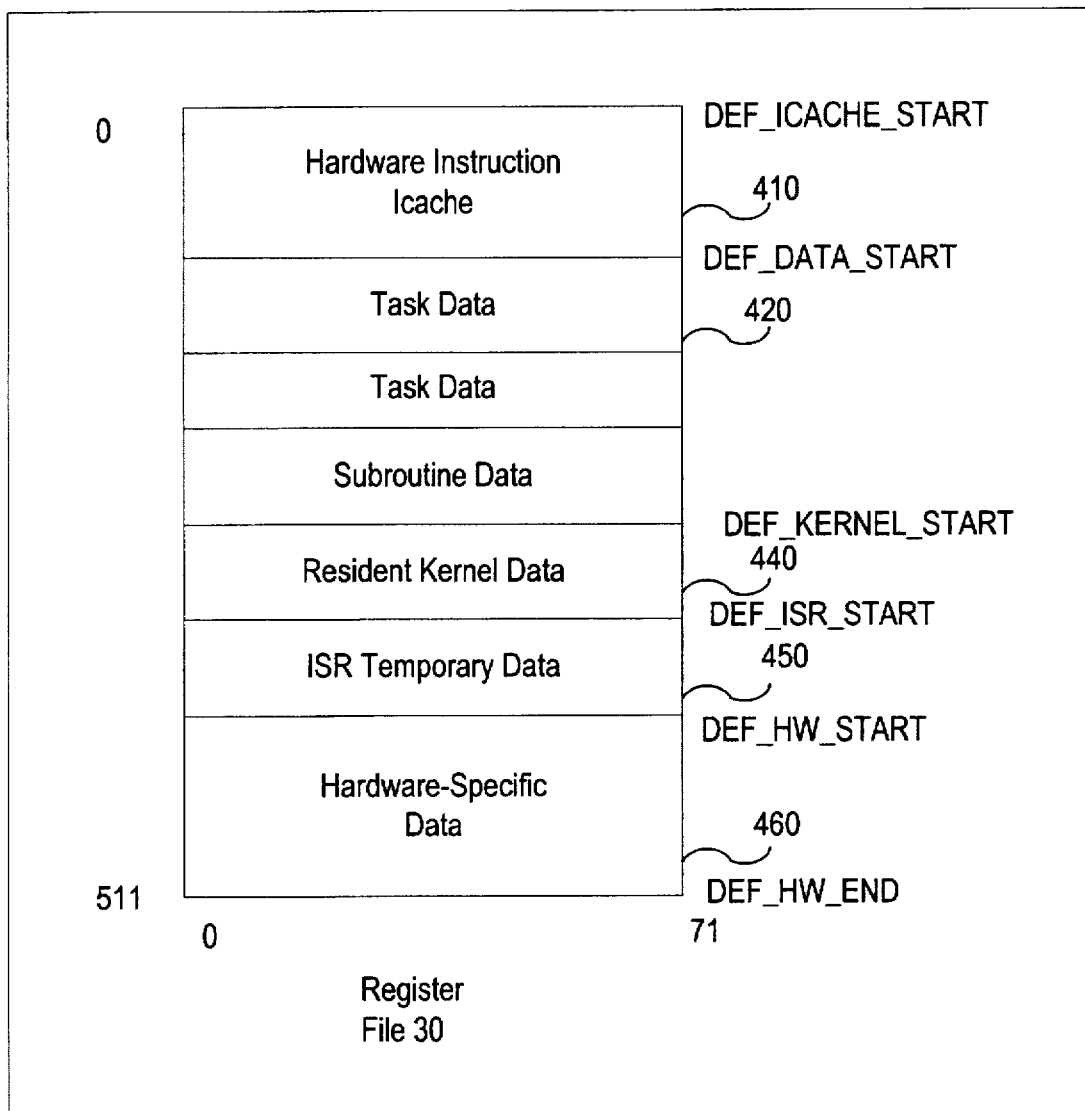
FIG. 4 is a block diagram of the register file current allocation and layout used by the software of FIG. 2 and the task created in FIG. 3.

Once a task is running, it has direct access to register file 30. FIG. 4 describes the present embodiment of register file 30 in more detail.

In the present embodiment, register file 30 is used simultaneously by hardware and XOS 180 or XOS 180 tasks. Register file 30, currently implemented as the media engine's on-chip static RAM, provides 4 Kbytes of memory for media engine programmers. In addition to holding temporary buffers for other on-chip hardware, register file 30 holds task code and working data. The present register file 30 provides space for data and instructions and facilitates data transfer between the media processor 20 and the host processor 120.

Register file 30 is split into 512 72-bit double words, or dwords. In the current implementation the media engine does not provide protected memory, therefore programmers must manage the register file allocation for each type of data. In another embodiment, software or hardware could provide enforcement of the register file access and allocation.

To ensure proper operation, XOS 180 expects certain data and instruction caches to be defined in a certain order in register file 30. XOS 180 accesses information in and stores information to register file 30. XOS 180 header files provide several macros to set the size of each area. Referring to FIG. 4, a description of register file 30's current layout is presented. All addresses and sizes are in dword units.

Beginning with hardware instruction icache 410, media processor 20 uses locations 0 to DEF_DATA_START to cache media processor instructions.

Task data 420, begins at DEF_DATA_START and is available for use by the XOS 180 tasks. Task specific variables described in the RMThread object specify how task data 420 is used. Referring back to FIG. 3, task data 420 may be any of constants, data, or subroutine data as specified in the fSMEMMask, fConstantMask, and fIcacheMask.

Other portions of register file 30 are allocated for XOS 180 and interrupt service processing. Resident kernel data 440 is an XOS 180 reserved area for resident XOS 180 data that must be stored in register file 30 at all times since XOS 180 must always be able to access the information stored in these locations. This information stored by XOS 180 in resident kernel data 440 includes both code segments and data. ISR Temporary Data 450 is the data area owned by the currently processing Interrupt Service Routine. It can be used for temporary data storage.

In the present embodiment, hardware-specific data 460 is the 64-dword data area that is contained within register file 30 reserved for the following hardware-specific data. PCI 40 accesses these dedicated registers, and XOS 180 and resource manager 170 utilize them to obtain hardware specific information.

TABLE 3

Hardware-Specific register file Data Locations

| Region | Size | Register File Location |
|---|---|---|
| PBUS DMA buffers | 12 dwords | 448 |
| Extra Kernel Registers | 4 dwords | 460 |
| PCI FIFO | 16 dwords | 464 |
| ISA Emulation FIFO | 16 dwords | 480 |
| Video FIFO | 16 dwords | 496 |

In the present embodiment special vector instructions are available on the media processor 20, it is efficient to divide register file 30 into 16 dword segments. This enables XOS 180 to use special instructions to access an entire segment at a time, and thereby more efficiently copy the register file 30 contents.

Once a task is running, it runs until it terminates, voluntarily gives up the processor, or is preempted by another task. When a task is not terminated, but must give up the processor, the volatile task context must be saved to a safe location. In the present embodiment, XOS 180 is responsible for performing this save. It is also essential in real-time systems that this operation not exceed the published latency—otherwise tasks that must execute within a certain period may fail. Therefore this operation must by highly optimized.

These operations will be better understood with reference to the figures.

Figure 5:
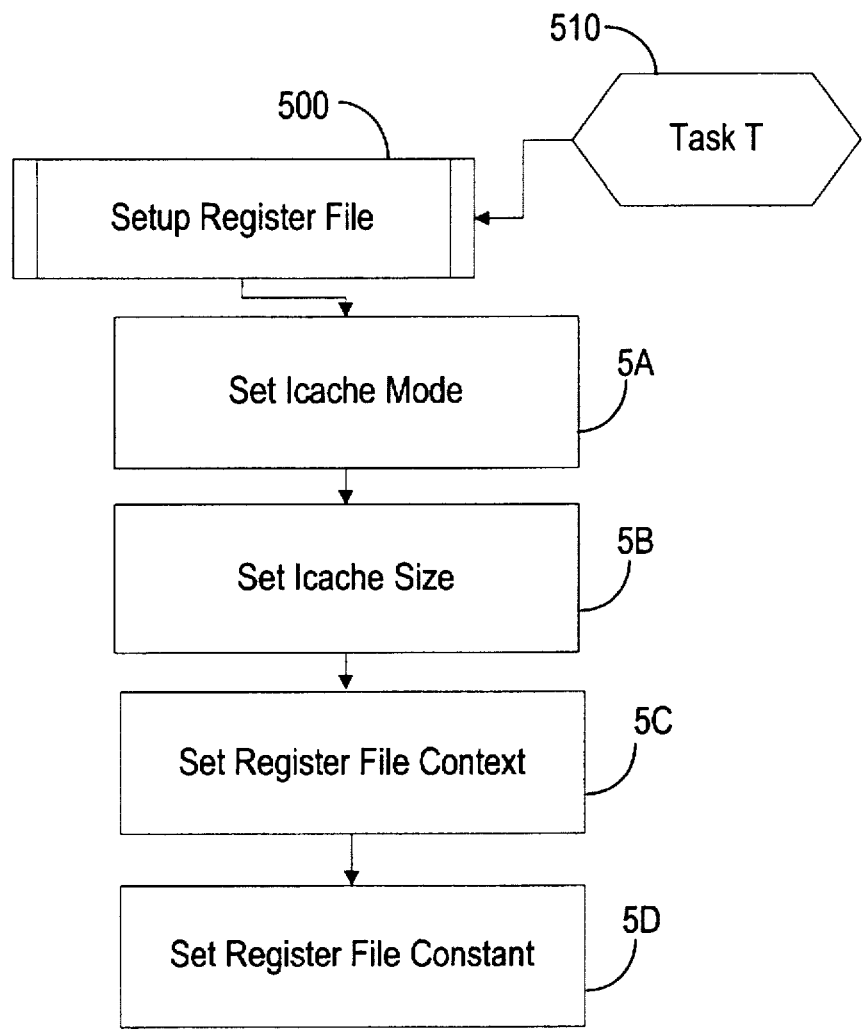
FIG. 5 is a block diagram of the software steps for setting up the task usage of the register file of FIG. 4, by the task of FIG. 3.

FIG. 5 describes the functional calling sequence to setup the register file upon task creation. Task 510 is operated on by setup register file routine 500. Tasks are free to change their initial configuration so long as they do so using the XOS 180 provided routines. In the present embodiment, task 510 may select how to use the various components of the register file. In a typical task initialization, task 510 would execute a procedure similar to setup register file 500.

In step 5A task 510 would first set the icache mode, by setting RMThread flIcachemode to a predefined value.

Next in step 5B Task 510 would set the icache size of the register file using routine xosSetICacheSize. Which allows Task 510 to specify how much of the icache it wishes to use.

TABLE 4 xosSetICacheSize
xosSetICacheSize (byte bMode)

| | |
|---|---|
| Effects: | Guarantees icache mode changes are handled properly. The initial icache size for a new task is programmed by resource manager 170 when the task is created. |
| Requires: | bMode is a byte inside an register file register or a constant with the value of 1, 2, or 3. Any other value is invalid. |
| Returns: | Nothing. |

Next in step 5C, Task 510 specifies the context of each segment of register file 30 using routine xosSetSmemContext. Register file context is used by XOS 180 to determine which segments in the register file need to be saved during a context switch.

TABLE 5 xosSetSmemContext
xosSetSmemContext (word wSmemMask)

| | |
|---|---|
| Effects: | Defines the current task's context within register file. The lower 32-bits of wSmemMask correspond with the 512 doubles of register file (one wSmemMask bit for 16 doubles of register file). Each wSmemMask bit indicates whether the scheduler should preserve the corresponding 16 doubles of register file during a context switch. Bit 0 of wSmemMask corresponds with the first 16 doubles of register file, and bit 31 corresponds with the last 16 doubles of register file. The bits of wSmemMask that indicate icache or any other register file outside of the task data area are ignored. Those bits are marked as zeros in the word constant SMEMNEVERMASK. Resource manager 170 programs the initial context of a new task when it creates the task. |
| Requires: | wSmemMask is a word inside a register file register or a constant. |
| Modifies: | Since this function redefines the current task's register file context, parts of register file may be saved to memory 110 or restored from it. Interrupts are disabled during some or all of this function's execution. |
| Returns: | Nothing. |

Finally in Step 5D, Task 510 specifies which segments of register file 30 are being used solely to store constant data by calling xosSetSmemConstants. Constant data is written once at task initialization and from then on used as read only data. This allows XOS 180 to further optimize context switching by only restoring these segments and not generally saving them.

TABLE 6 xosSetSmemConstants
xosSetSmemConstants (word wConstantMask)

| | |
|---|---|
| Effects: | Defines the current task's constant data with its register file context. The lower 32-bits of wConstantMask correspond with the 512 doubles of register file (one wConstantMask bit for 16 doubles of register file). Each wConstantMask indicates whether the scheduler should only restore and not save the corresponding 16 doubles of register file during the proper context switches. Bit 0 of wConstantMask corresponds with the first 16 doubles of register file, and bit 31 corresponds with the last 16 doubles of register file. XOS 180 saves constant data areas once when a task calls this function to set new constant areas of register file. |
| Requires: | Establish the task's entire register file data context first, including constant data areas, by calling xosSetSmemContext( ) before calling xosSetSmemConstants( ) Once an register file data area is set as constant data using this function, the task cannot modify that area without calling xosSetSmemConstants( ) again to modify it. |
| Modifies: | Sets new constant areas of register file, which requires the |

TABLE 6-continued xosSetSmemConstants
xosSetSmemConstants (word wConstantMask)

kernel to save register file context to memory 110. Interrupts are disabled during some or all of this function's execution.
Returns: Nothing.

One skilled in the art would recognize that many permutations of this method are possible. For example, in another embodiment, the operating system or hardware may setup defaults for the register file allocation. In still another embodiment, the operating system or hardware may impose constraints on the task's ability to allocate and directly manage various portions of the register file. In yet a third embodiment, a compiler or assembler could predetermine task register file allocation needs and communicate these requirements directly to the operating system or hardware managing the register file.

As can be seen from FIG. 4, the largest part of a task's context is the register file task data area 420. The time to context switch a task is directly proportional to the size of the register file data area claimed by the task. To make multiple context switches between two tasks more efficient, XOS 180 swaps out only the portion of the departing task's context that would be overwritten by the incoming task's context. Later, when the second task is swapped for a third task, the rest of the original task context is swapped out. However, if context switches back to the original task, its unsaved context remains.

To further optimize task context switches, a task may indicate, at any time, the areas of its register file data space that are filled with constant data by using the kernel subroutine xosSetSmemConstants (). This subroutine enables the kernel to save the task's constant register file data only once. During context switch restores, the kernel restores only constant register file data.

Figure 6:
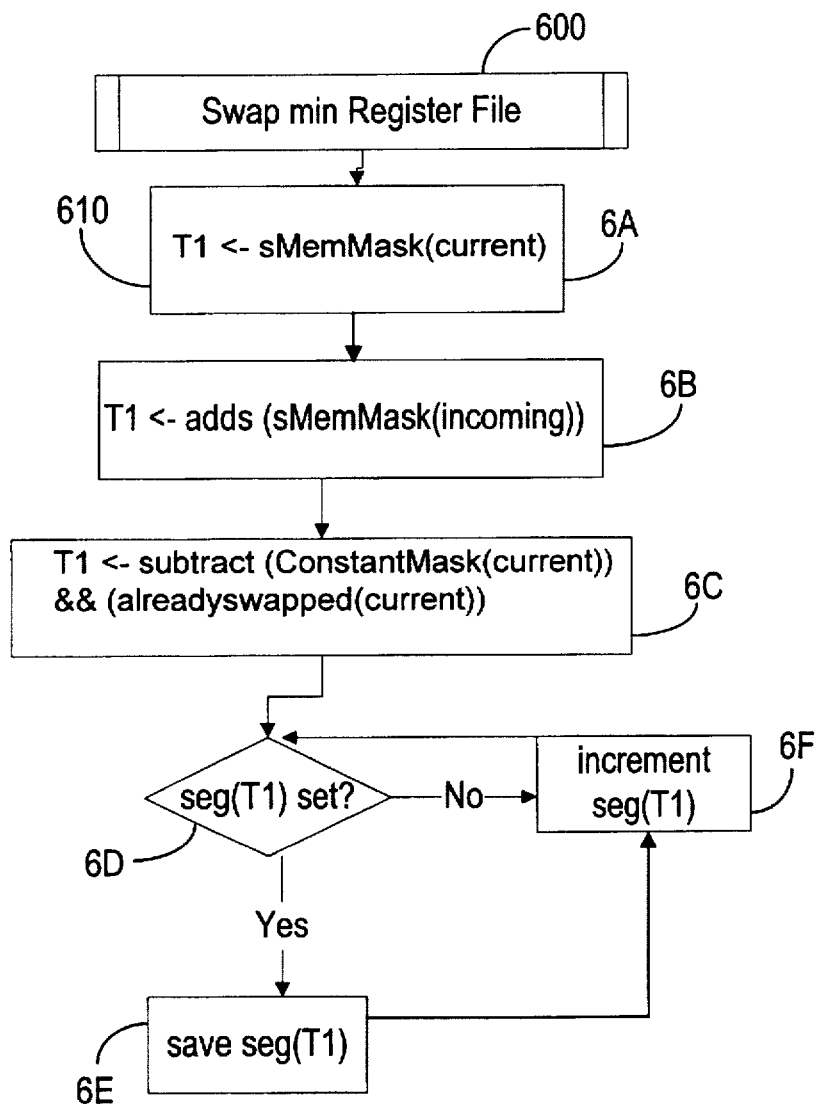
FIG. 6 is a flowchart of the optimized context switching function implemented by the software of FIG. 2 operating on the register file of FIG. 4.

Referring to FIG. 6, the present embodiment of swapping the contents of register file 30 is described. Swap rain register file 600, computes the minimum amount of data to be copied to the save area, such as memory 110, using boolean arithmetic to operate on the masks in parallel thereby creating a mask which indicates which segments need to be saved before the routine starts copying.

In the present embodiment, a temporary mask T1 610 is created, possibly in a kernel register or alternatively in a memory location. In the preferred embodiment, T1 610 is a register since boolean arithmetic operations operate faster on registers than on memory locations.

In step 6A, mask T1 is loaded with the current register file 30 utilization from the current task. In step 6B, T1 has added into the mask those segments of register file 30 that the incoming task has specified it will use.

In step 6C, register file segments of the current task which have been specified by the system as constant only data, and which have been previously saved are removed from T1 610 as they need not be saved.

While the present invention describes operations 6A-6C in a particular order, it should be recognized that the operations are associative and therefore may be performed in any logical order.

Once mask T1 610 is generated, step 6D looks to see if the bit corresponding to a particular register file 30 section is set. If it is, the method proceeds to step 6E where the data is actually copied.

If the mask indicator is not set, step 6F increments to the bit position associated with the next register file segment. It will be appreciated that many different methods can be used to advance to the next T1 610 mask indicator position. Such methods include shifting T1 610, in the present embodiment, but could also include updating a pointer, masking to a particular position or other types of routines to increment to the next position.

In step 6E, after the register file 30 segment has been copied to backing store such as memory 110, control is advanced to step 6F described above.

The method terminates when all mask indicator positions have been examined and all register file 30 segments have been copied.

Software implementations in C++ and media engine assembler corresponding to the present embodiment disclosed is included as Appendix A.

Other Embodiments

Other embodiments are within the following claims.

More specifically, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

APPENDIX A

```
//--------------------------------
// Scheduler Functions
//
// The scheduler functions all use the ks (kernel scheduler)
structure in
// kernel data space (krn.alus) and ISR data space. ks includes
the kregs
// structure.
// struct _KS {
    KREGS regs;
    packed word pkw;            //:SMEM bitmask (packed).
    packed word pkwPtr;         //:Rdram ptr to thread's SMEM or
IO context.
    packed word pkwCnt;         //:Counter/temporary variable.
    TCB tcb;                    //:
    packed half hfCode0;        //:Used in krnRestoreIO,
xosBootStrap.
    packed half hfCode1;        //:Used in krnRestoreIO,
xosBootStrap
    packed word newB;
    packed half pkhfRegLink;
    ks = %(DEF_ISR_START - SIZEOF_ALUS);  // Overlaps
with krn.alus.

extern fragment krnSaveSmem();

extern fragment krnSaveIO();

extern fragment krnRestoreSmem();

extern fragment krnRestoreIO();

extern fragment krnSwitch();

extern fragment _krnSchedule();
#define krnSchedule() if (krn.wInterruptedThread) {
    _krnSchedule(); } extern fragment _IdleLoop();

extern fragment _HaltThisThread();

extern fragment _xosSetSmemContext();

extern fragment _xosSetSmemConstants();

extern fragment _xosSetCacheSize();

extern fragment _xosSetDataSegment();

extern fragment _xosJmpFar();

extern fragment _xosCallFar();

extern fragment _xosSetThreadSignalJumpback();
//------------------------ Start of Scheduler Functions ---------
//------------------------
//---------
```

A1-1

APPENDIX A

```
// The scheduler functions all use the ks (kernel scheduler)
structure in ISR
// data space.

fragment krnSaveSmem()
{
// Requires:  ks.pkw[4]     - Has save bitmask.
//            ks.pkwPtr[0]  - Has context pointer.
//
// Modifies:  ks.regs.w_p3_all
//            p3 set noild;
deletepool;
set nooptimize;

// Save p3 into ks.regs.w_p3_all.
// Initialize p3 to start of legal context MIN_ICACHE_SIZE
* 8.
[in (untyped) ks.regs.w_p3_all, reg_vsp_ptr3_all;
out reg_vsp_ptr3_all, (byte) (MIN_ICACHE_SIZE * 8)]

SmemLoop:
// Assume ks.pkw has SMEM mask (packed).
// Find first 1. Assume b35 of ks.pkw is 0.
[ffx.w ks.pkwCnt, ks.pkw ||| noop]

// Check if ks.pkwCnt == 35. If so, jmp to SmemDone.
// Compute (ks.pkwCnt + 2).
// Compute (128 * ks.pkwCnt), store in ks.pkwCnt.
[eq.3.w @, ks.pkwCnt, 35 ||| add.2.w @, ks.pkwCnt, 2]
[bnu @,3, SmemDone ||| sh.w ks.pkwCnt, ks.pkwCnt, 7]

// Increment p3 by (128 * ks.pkwCnt).
// Increment ks.wCtxtPtr by (128 * ks.pkwCnt).
// Shift ks.pkw by (ks.pkwCnt + 2), thus assuming 32 dword
store.
// Check if only 16 should be saved and do jump if so.
[sh.w ks.pkw, ks.pkw, @,2 ||| add.2.h p3, (untyped)
ks.pkwCnt, p3]
[bpu ks.pkw, Only16 ||| add.2.w ks.pkwPtr, ks.pkwPtr,
ks.pkwCnt]

// Store 32 dwords.
// Continue looping.
// Do some shifty things.
[sh.w ks.pkw, ks.pkw, 1;
sh.w ks.pkw, ks.pkw, -3]
[jmp SmemLoop ||| st (ks.pkwPtr), @p3, 32 * 8 - 1]

Only16:
// Store 16 dword and correct shift.
[st (ks.pkwPtr), @p3, 16 * 8 - 1 ||| sh.w ks.pkw, ks.pkw, -2]
[jmp SmemLoop ||| noop]

SmemDone:
[jmp reg_vsp_link ||| noop]
}
```

A1-2

APPENDIX A fragment krnSaveIO()
{
set noild;
deletepool;
set nooptimize;

// Requires:  ks.pkwPtr, points to IO context (kregs struct) in RDRAM
//            Interrupts are turned off
//
// Modifies:  ks.regs
//            Single store to RDRAM // Save half-sized registers.
[in (untyped) ks.regs.hf_tagctl, reg_vsp_tagctl;
in @, reg_vsp_intlink]
[in @, reg_vsp_veclen1 ||| wedge.h (untyped) ks.regs.hf_intlink,
    offsetof(ks.regs. hf_intlink) << 4, @,2]
[in @, reg_vsp_veclen2 ||| wedge.h (untyped) ks.regs.hf_vc1,
    offsetof(ks.regs.hf_vc1) << 4, @,2]
[in (untyped) ks.regs.hf_rop, reg_vsp_rop ||| wedge.h
(untyped)
ks.regs.hf_vc2, offsetof(ks.regs.hf_vc2) << 4, @,2]
// in (untyped) ks.regs.hf_idct, reg_vsp_idct!!!
[noop;
in @, reg_vsp_offset]
[in @, reg_vsp_round ||| wedge.h (untyped) ks.regs.hf_offset,
    offsetof(ks.regs.hf_offset) << 4, @,2]
// in @, reg_vsp_repcnt!!!
[noop ||| wedge.h (untyped) ks.regs.hf_round,
    offsetof(ks.regs.hf_round) << 4, @,2]

// Finish halfs, start words.
[in (untyped) ks.regs.w_lfsr, reg_vsp_lfsr ||| wedge.h
(untyped)
ks.regs.hf_repcnt, offsetof(ks.regs.hf_repcnt) << 4, @,2]
// in @, reg_vsp_repaddr!!!
[noop ||| wedge.h (untyped) ks.regs.hf_link,
    offsetof(ks.regs.hf_link) << 4, (untyped) krn.pkwLink]
[in @, reg_vsp_guard ||| wedge.w (untyped)
ks.regs.w_repaddr,
    offsetof(ks.regs.w_repaddr) << 4, @,2]
[in (untyped) ks.regs.w_p0_all, reg_vsp_ptr0_all ||| wedge.w
(untyped)
    ks.regs.w_guard, offsetof(ks.regs.w_guard) << 4, @,2]
[in (untyped) ks.regs.w_p2_all, reg_vsp_ptr2_all;
in @, reg_vsp_ptr1_all]

// Assume reg_vsp_p3 was already saved to ks.regs.w_p3_all.
// Save AGE register in ks.pkwAge (nomad.w.pkwAge,
ks.pkwAge, 0)!!!
// Store ks.regs to ks.pkwPtr.
[wedge.w (untyped) ks.regs.w_p1_all,
    offsetof(ks.regs.w_p1_all) << 4, @,2
||| st (ks.pkwPtr), ks.regs, sizeof(KREGS) - 1]

// Return.
[jmp reg_vsp_link ||| noop]
}

A1-3

APPENDIX A

```
fragment krnRestoreSmem()
{
    set noild;
    deletepool;
    set nooptimize;

// Requires:  ks.pkw[4]    - Has smem restore bitmask.
    //            ks.pkwPtr[0] - Has context pointer.
    //
    // Modifies:  p3

// Initialize p3 to start of legal SMEM context
    MIN_ICACHE_SIZE * 8.
    [out reg_vsp_ptr3_all, (byte) (MIN_ICACHE_SIZE * 8) |||
    noop]

SmemLoop:
    // Assume ks.pkw has SMEM mask (packed).
    // Find first 1.  Assume b35 of ks.pkw is 0.
    [ffx.w ks.pkwCnt, ks.pkw ||| noop]

// Check if ks.pkwCnt == 35.  If so, jmp to SmemDone.
    // Compute (ks.pkwCnt + 2).
    // Compute (128 * ks.pkwCnt), store in ks.pkwCnt.
    [eq.3.w @, ks.pkwCnt, 35 ||| add.2.w @, ks.pkwCnt, 2]
    [bnu @.3, SmemDone ||| sh.w ks.pkwCnt, ks.pkwCnt, 7]

// Increment p3 by (128 * ks.pkwCnt).
    // Increment ks.wCtxtPtr by (128 * ks.pkwCnt).

// Shift ks.pkw by (ks.pkwCnt + 2), thus assuming 32 dword
    store.
    // Check if only 16 should be loaded and do jump if so.
    [sh.w ks.pkw, ks.pkw, @.2 ||| add.2.h p3, (untyped)
    ks.pkwCnt, p3]
    [bpu ks.pkw, Only16 ||| add.2.w ks.pkwPtr, ks.pkwPtr,
    ks.pkwCnt]

// Load 32 dwords.
    // Continue looping.
    // Do some shifty things.
    [sh.w ks.pkw, ks.pkw, 1;
    sh.w ks.pkw, ks.pkw, -3]
    [jmp SmemLoop ||| ld @p3, (ks.pkwPtr), 32 * 8 - 1]

Only16:
    // Store 16 dword and correct shift.
    [ld @p3, (ks.pkwPtr), 16 * 8 - 1 ||| sh.w ks.pkw, ks.pkw, -2]
    [jmp SmemLoop ||| noop]

SmemDone:
    [jmp reg_vsp_link ||| noop]
} fragment krnRestoreIO()
{
    set noild;
    deletepool;
    set nooptimize;
```

A1-4

APPENDIX A

```
// Requires:  ks.pkwPtr, points to IO context (kregs struct) in
RDRAM
//          ks.tcb.tlnk.wTLD
//          ks.tcb.wCodeSegID
//          ks.tcb.wDataSegID
//          Interrupts are turned off
//
// Modifies:  ks.pkw
//           ks.pkwCnt
//           ks.regs
//           ks.hfCode
//           Multiple reads from RDRAM // Load ks.regs and setup sync vector.
[ld ks.regs, ((untyped) ks.pkwPtr), sizeof(KREGS) - 1;
out reg_vsp_veclen1, (memberoffset(KREGS, hf_intlink) >>
3) + 1]

/*
// Hack overlay code into ks.hfCode0 and ks.hfCode1.
// v17 [noop; noop] [noop; iret] is [0x1c0e0 0 0 0] [0x19ee0 0
0 0].
[movbi.3.h ks.hfCode0, 0 ||| movbi.1.h ks.hfCode1, 0]
[movhi.3.h @, 0x1c0e0 ||| movhi.1.h @, 0x19ee0]
[ins.h ks.hfCode0, @, 3, 6;
ins.h ks.hfCode1, @, 1, 6]
*/

// If (ks.tcb.wTLD << 2), the new thread was awakened by a
thread signal.

// and if jumpback point is not equal to WAIT_RETURN (-
1), use jumpback.
// Setup intlink as if it was a thread signal.
[movbi.3.h @, -1 ||| exp.h @, (untyped) ks.tcb.hfJumpback,
offsetof(ks.tcb.hfJumpback)]
[exp.w @, (untyped) ks.tcb.tlnk.wTLD,
offsetof(ks.tcb.tlnk.wTLD) |||
eq.2.h @, @,1, @,3
[xor.3.h @, @,3, @,2 ||| sh.w @, @,1, 2]
[and.3.w @, @,3, @,1 ||| out reg_vsp_intlink, (untyped)
ks.tcb.hfJumpback]

// Vector sync.
vector1 [noop ||| add.2.w @, ks.regs.alus.pkwAlu1, 0]

// Branch if it was a thread signal.
// Load codebase value into ks.pkw[0].
[bnu @,3, SkipRestoreIntLink ||| ld (untyped) ks.pkw,
((untyped)
                ks.tcb.wCodeSegID), sizeof(word) - 1]

// No jumpback, so restore intlink.
[exp.h @, (untyped) ks.regs.hf_intlink,
offsetof(ks.regs.hf_intlink);
out reg_vsp_intlink, @,1]

SkipRestoreIntLink:
// Output all the half registers (except tagctl).
[exp.h @, (untyped) ks.regs.hf_vc1, offsetof(ks.regs.hf_vc1)
||| noop]
```

APPENDIX A

```
[out reg_vsp_veclen1, @.1 ||| exp.h @, (untyped)
ks.regs.hf_vc2,
    offsetof(ks.regs.hf_vc2)]
[out reg_vsp_veclen2, @.1 ||| exp.h @, (untyped)
ks.regs.hf_offset,
    offsetof(ks.regs.hf_offset)]
[out reg_vsp_offset, @.1 ||| exp.h @, (untyped)
ks.regs.hf_round,
    offsetof(ks.regs.hf_round)]
[out reg_vsp_round, @.1 ||| exp.h @, (untyped)
ks.regs.hf_repcnt,
    offsetof(ks.regs.hf_repcnt)]
// out reg_vsp_repcnt, @.1!!!
[noop ||| exp.h @, (untyped) ks.regs.hf_link,
    offsetof(ks.regs.hf_link)]

// Finish up half registers.  Load database value into
ks.pkwCnt[0].
[out reg_vsp_link, @.1 ||| exp.w @, (untyped)
ks.tcb.wDataSegID,
    offsetof(ks.tcb.wDataSegID)]
[ld (untyped) ks.pkwCnt, (@.1), sizeof(word) - 1;
out reg_vsp_rop, (untyped) ks.regs.hf_rop]
// out reg_vsp_idct, (untyped) ks.regs.hf_idct!!!

// Output all the word registers.
[out reg_vsp_lfsr, ks.regs.w_lfsr ||| exp.w @, (untyped)
    ks.regs.w_repaddr, offsetof(ks.regs.w_repaddr)]
// out reg_vsp_repaddr, @.1!!!
[noop ||| exp.w @, (untyped) ks.regs.w_guard,
    offsetof(ks.regs.w_guard)]
[out reg_vsp_guard, @.1 ||| exp.w @, (untyped)
ks.regs.w_p1_all,
    offsetof(ks.regs.w_p1_all)]
[out reg_vsp_ptr1_all, @.1 ||| exp.w @, (untyped)
ks.regs.w_p3_all,
    offsetof(ks.regs.w_p3_all)]
[out reg_vsp_ptr3_all, @.1;
out reg_vsp_ptr0_all, (untyped) ks.regs.w_p0_all]

// Finish word registers.  Output codebase and database.
// Restore AGE register (mad.w @, @.3, @.3, ks.pkwAge)!!!
[out reg_vsp_ptr2_all, (untyped) ks.regs.w_p2_all;
out reg_vsp_database, (untyped) ks.pkwCnt]

// Restore ALUS.
[movq.3 @, ks.regs.alus.pkwAlu3, ks.regs.alus.pkwAluQ |||
movq.1 @,
    ks.regs.alus.pkwAlu1, ks.regs.alus.pkwAluM]
[add.2.w @, ks.regs.alus.pkwAlu2, 0;
    out reg_vsp_codebase, (untyped) ks.pkw]

// Restore tagctl and iret.
/*
[jmp (0x1FF000 + (DEF_ISR_START-SIZEOF_ALUS)*8 +
memberoffset(struct_KS,
    hfCode0)) ||| out reg_vsp_tagctl, (untyped)
ks.regs.hf_tagctl]
*/
[iret ||| noop]
```

APPENDIX A

```
} fragment _krnSchedule()
{
    set noild:
    deletepool;
    set nooptimize;

[in (untyped) krn.pkwLink, reg_vsp_link ||| noop]
    [jmp krnSwitch ||| out reg_vsp_intlink, (untyped)
    krn.pkwLink]
} fragment krnSwitch()
{
    // Requires:  Interrupts are turned off.
    //            krn.wInterruptedThread is not zero.
    //            reg_vsp_link is saved magically by caller.
    //
    // Modifies:  May call krnSaveSmem()
    //            May call krnSaveIO()
    //            May call krnRestoreSmem()
    //            May call krnRestoreIO()

set noild;
    deletepool;
    set nooptimize;

// There are three threads to consider.
    //
    // A. krn.wPreviousThread    - the previously swapped-out thread
    // B. krn.wInterruptedThread - the interrupted thread
    // C. krn.tdCurrent.wThread  - the new thread
    //
    // Let's actually use the letters A, B, and C to denote the thread's
    // context bitmasks.  Let's use Anc, Bnc, and Cnc to denote the thread's
    // complemented constant bitmasks.

#define A    krnExtra.wPreviousBitmask
    #define B    krn.wCurrentBitmask
    #define C    ks.tcb.wBitmask define Anc  krnExtra.wPreviousConstants
    #define Bnc  krn.wCurrentConstants
    #define Cnc  ks.tcb.wConstants // The code in this function assumes the following
    // alignments:
    //
    //    A 0    Anc 4
    //    B 0    Bnc 4
    //    C 0    Cnc 4

// Load new thread's TCB.
    // If the new thread and the previously swapped-out thread
    // are the same,
    // let's optimize (jump away if not).
```

A1-7

APPENDIX A

```
[eq.3.w @, (untyped) km.tdCurrent.wThread.
kmExtra.wPreviousThread |||
  ld ks.tcb, (km.tdCurrent.wThread), sizeof(TCB) - 1]
[exp.w @, @.3, offsetof(km.tdCurrent.wThread);
bpu @.1, NotSame]

// ks.pkw[4] = explode(A & B) & Bnc.
// ks.pkwPtr[0] = km.wCurrentContextPtr (assume
alignment).
// Call kmSaveSmem().
[and.3.w @, A, B ||| add.2.w ks.pkwPtr, (untyped)
km.wCurrentContextPtr,
 0]
[exp.w @, @.3, offsetof(A) ||| noop]
[call kmSaveSmem ||| and.2.w ks.pkw, @.1, (untyped) Bnc]

// ks.pkwPtr[0] = km.wCurrentContextPtr +
MAX_DATA_SIZE * 8.
// Call kmSaveIO().
[movhi.3.w @, MAX_DATA_SIZE * 8 ||| noop]
[call kmSaveIO ||| add.2.w ks.pkwPtr, (untyped)
km.wCurrentContextPtr,
 @.3]

// Reset size of the icache, if it needs it.
[movhi.w @.3, (MAX_DATA_SIZE * 8) +
memberoffset(KREGS, hf_tagctl) |||
exp.w @.1, kmExtra.wPreviousContextPtr, 4]
[add.2.w @.2, @.3, @.1;
 ld ks.pkw, (@.2), sizeof(half) - 1]

[in @.2, reg_vsp_tagctl ||| movbi.1.h @.1, 0x3]
[and.3.h @.3, (untyped) ks.pkw, @.1 ||| and.2.h @.2, @.2,
@.1]
[eq.2.h @.2, @.2, @.3;
 exp.h @.1, @.2, 0]
[bnl @.1, RestoreSmem0 ||| noop]

SetTagCtl0:
// Hack overlay code into ks.hfCode0 and ks.hfCode1.
// v17 [noop: noop] [noop; jmpr] is [0x1c0e0 0 0 0] [0x198e0
0 0 0].
[movbi.3.h ks.hfCode0, 0 ||| movbi.1.h ks.hfCode1, 0]
[movhi.3.h @, 0x1c0e0 ||| movhi.1.h @, 0x198e0]
[ins.h ks.hfCode0, @.3, 6;
 ins.h ks.hfCode1, @.1, 6]
[call (0x1FF000 + (DEF_ISR_START-SIZEOF_ALUS) * 8
+ memberoffset(struct
     KS, hfCode0)) ||| out reg_vsp_tagctl, (untyped) ks.pkw]

RestoreSmem0:
// ks.pkw[4] = explode(A & B).
// ks.pkwPtr = explode(kmExtra.wPreviousContextPtr).
// Call kmRestoreSmem().
[exp.w ks.pkwPtr, kmExtra.wPreviousContextPtr, 4 |||
and.2.w @, A, B]
[call kmRestoreSmem ||| exp.w ks.pkw, @.2, offsetof(A)

// Exchange km.wCurrentBitmask/.wCurrentConstants with
// kmExtra.wPreviousBitmask/.wPreviousConstants.
[add.3.w (untyped) kmExtra.wPreviousBitmask,
km.wCurrentBitmask, 0 |||
```

A1-8

APPENDIX A

```
         add.2.w (untyped) km.wCurrentBitmask,
     kmExtra.wPreviousBitmask, 0]

// kmExtra.wPreviousThread =
    wedge(km.wInterruptedThread).
    // ks.pkw =
    kmExtra.wPreviousThread/.wPreviousContextPtr.
         [wedge.w (untyped) kmExtra.wPreviousThread, 0x04,
    km.wInterruptedThread
         ||| add.2.w ks.pkw, (untyped) kmExtra.wPreviousThread, 0]

// kmExtra.wPreviousContextPtr =
    wedge(km.wCurrentContextPtr).
    // km.wCurrentContextPtr = wedge(ks.pkw).
         [wedge.w (untyped) kmExtra.wPreviousContextPtr, 0x40,
              km.wCurrentContextPtr ||| noop]
         [movbi.3.b @, 0 ||| wedge.w (untyped)
    km.wCurrentContextPtr, 0x04,
         ks.pkw]

// km.wInterruptedThread = 0.
    // ks.pkwPtr[0] = km.wCurrentContextPtr +
    MAX_DATA_SIZE * 8.
    // Jump away to kmRestoreIO().
         [ins.w (untyped) km.wInterruptedThread, @,3,
              offsetof(km.wInterruptedThread) ||| movhi.1.w @,
    MAX_DATA_SIZE * 8]
         [jmp kmRestoreIO ||| add.2.w ks.pkwPtr, (untyped)
    km.wCurrentContextPtr,
         @,1]

NotSame:
    // ks.pkw[4] = explode(A & (~B)) & Anc.
    // ks.pkwPtr = explode(kmExtra.wPreviousContextPtr).
    // Call kmSaveSmem().
         [movbi.1.b @, 0x1FF;
         xor.2.w @, @,1, B]
         [and.3.w @, @,2, A ||| exp.w ks.pkwPtr,
    kmExtra.wPreviousContextPtr, 4]
         [exp.w @, @,3, offsetof(A) ||| noop]
         [call kmSaveSmem ||| and.2.w ks.pkw, @,1, (untyped) Anc]

// Sync with new thread's TCB load from beginning of this
    function.
    // (It's possible that kmSaveSmem() doesn't save anything!)
         [out reg_vsp_veclen1, (memberoffset(TCB, wBitmask) >> 3)
    + 2 ||| noop]
         [add.3.w @, (untyped) B, 0 ||| add.2.w ks.pkwPtr, (untyped)
              km.wCurrentContextPtr, 0]
         vector1 [exp.w @, @,2, offsetof(B) ||| and.2.w @, @,3,
    (untyped)
              ks.tcb.tlnk.wTLD]

// ks.pkw[4] = explode(B & C) & Bnc.
    // ks.pkwPtr[0] = km.wCurrentContextPtr.
    // Call kmSaveSmem().
         [call kmSaveSmem ||| and.2.w ks.pkw, @,1, (untyped) Bnc]

// ks.pkwPtr[0] = km.wCurrentContextPtr +
    MAX_DATA_SIZE * 8.
```

A1-9

APPENDIX A

```
// Call krnSaveIO().
[movhi.3.w @, MAX_DATA_SIZE * 8 ||| noop]
[call krnSaveIO ||| add.2.w ks.pkwPtr, (untyped)
    krn.wCurrentContextPtr,
    @.3]

// Reset size of the icache, if it needs it.
[movhi.w @.3, (MAX_DATA_SIZE * 8) +
    memberoffset(KREGS, hf_tagctl) |||
    noop]
[add.2.w @.2, @.3, (untyped) ks.tcb.wContextPtr;
    ld ks.pkw, (@.2), sizeof(half) - 1]
[in @.2, reg_vsp_tagctl ||| movbi.1.h @.1, 0x3]
[and.3.h @.3, (untyped) ks.pkw, @.1 ||| and.2.h @.2, @.2,
    @.1]
[eq.2.h @.2, @.2, @.3;
    exp.h @.1, @.2, 0]
[bnl @.1, RestoreSmem1 ||| noop]
SetTagCtl1:
// Hack overlay code into ks.hfCode0 and ks.hfCode1.
// v17 [noop; noop] [noop; jmpr] is [0x1c0e0 0 0 0] [0x198e0
    0 0 0].
[movbi.3.h ks.hfCode0, 0 ||| movbi.1.h ks.hfCode1, 0]
[movbi.3.h @, 0x1c0e0 ||| movbi.1.h @, 0x198e0]
[ins.h ks.hfCode0, @.3, 6;
    ins.h ks.hfCode1, @.1, 6]
[call (0x1FF000 + (DEF_ISR_START-SIZEOF_ALUS) * 8
    + memberoffset(struct
    KS, hfCode0)) ||| out reg_vsp_tagctl, (untyped) ks.pkw]
```

```
RestoreSmem1:
    // ks.pkw[4] = explode(C).
    // ks.pkwPtr[0] = ks.tcb.wContextPtr.
    // Call krnRestoreSmem().
    [exp.w ks.pkw, (untyped) C, offsetof(C) ||| noop]
    [call krnRestoreSmem ||| add.2.w ks.pkwPtr, (untyped)
        ks.tcb.wContextPtr,
        0]

// Copy current/interrupted to previous kernel values.
// Copy ks.tcb to current kernel values.
// ks.pkw = 0.
[wedge.w (untyped) krnExtra.wPreviousThread, 0x04,
    krn.wInterruptedThread
    ||| add.2.w (untyped) krnExtra.wPreviousBitmask,krn.
    wCurrentBitmask,0]
[movbi.3.w ks.pkw, 0 ||| wedge.w (untyped)
    krnExtra.wPreviousContextPtr,
    0x40, krn.wCurrentContextPtr]
[ins.w (untyped) krn.wCurrentContextPtr, (untyped)
    krn.wCurrentContextPtr,
    ks.tcb.wContextPtr, 0 ||| add.2.w (untyped) krn.
    wCurrentBitmask,
    (untyped) ks.tcb.wBitmask, 0]

// krn.wInterruptedThread = 0.
// ks.pkwPtr[0] = krn.wCurrentContextPtr +
    MAX_DATA_SIZE * 8.
// Jump away to krnRestoreIO().
```

APPENDIX A

```
[ins.w (untyped) krn.wInterruptedThread, (untyped)
krn.wInterruptedThread,
ks.pkw, offsetof(krn.wInterruptedThread) ||| movhi.1.w @,
    MAX_DATA_SIZE * 8]
[jmp krnRestoreIO ||| add.2.w ks.pkwPtr, (untyped)
krn.wCurrentContextPtr,
    @.1]
} fragment _IdleLoop()
{
Loop:
    jmp Loop;
} fragment _HaltThisThread()
{
    set noild;
    deletepool;
    set nooptimize;

[call krnNextFromReadyList ||| intdis]
    [call _krnSchedule ||| noop]
    AssertString(-1, "Someone woke up a dead thread!");
} fragment _xosSetSmemContext()
{
    // Requires:  Interrupts are turned off.
    //     ks.pkw (bitmask that needs reversing)
```

```
//
// Modifies:   ks.pkwIO[0]
//             ks.pkwIO[1]
//             ks.pkw
//             ks.pkwPtr
//             Calls krnSaveSmem().
//             Calls krnRestoreSmem().

set noild;
    deletepool;
    set nooptimize;

// Save reg_vsp_link.
    // newB = (reverse(ks.pkw) << 1).
    // Fill @.3 with 1's (for following xor inst).
    [noop ||| movvi.w @, w_REVW]
    [sw11 @, ks.pkw, @.1 ||| noop]
    [in (untyped) ks.pkhfRegLink, reg_vsp_link ||| rev.b @, @.1]
    [movbi.3.b @, 0x1FF ||| sh.w ks.newB, @.1, 1]

// ks.pkw = explode(A & (~B) & newB) & Anc.
    // ks.pkwPtr = explode(krnExtra.wPreviousContextPtr).
    // Update B to newB.
    // Call krnSaveSmem().
    [exp.w ks.pkwPtr, krnExtra.wPreviousContextPtr,
        offsetof(krnExtra.wPreviousContextPtr) ||| xor.2.w @, @.3,
B]
    [ins.w (untyped) B, (untyped) B, ks.newB, 0 ||| and.2.w @,
        @.2, A]
    [and.2.w @, @.2, ks.newB;
```

A1-11

APPENDIX A

```
exp.w @, @.2, offsetof(A)]                          // Modifies:  ks.pkwIO[0]
[call krnSaveSmem ||| and.2.w ks.pkw, @.1, (untyped) Anc]  //            ks.pkwIO[1]
                                                    //            ks.pkwIO[2]
// ks.pkw = explode(A & B & newB).                  //            ks.pkw
// ks.pkwPtr = explode(krnExtra.wPreviousContextPtr). //          ks.pkwPtr
// Call krnRestoreSmem().                           //            Calls krnSaveSmem().
[exp.w (untyped) ks.pkwPtr, (untyped)               //            Calls krnRestoreSmem().
krnExtra.wPreviousContextPtr,
   offsetof(krnExtra.wPreviousContextPtr) ||| and.2.w @, A,   set noild;
B]                                                             deletepool;
[and.3.w @, @.2, ks.newB ||| noop]                             set nooptimize;
[call krnRestoreSmem ||| exp.w ks.pkw, @.3, offsetof(A)]
                                                    // newBnc = (ones-complement(reverse(ks.pkw)) << 1).
                                                    // ks.pkw[4] = (~Bnc) & newBnc.
                                                    // ks.pkwPtr[0] = krn.wCurrentContextPtr.
                                                    // Save reg_vsp_link.
                                                    // Call krnSaveSmem().
                                                    [noop ||| movwi.w @, w REVW]
                                                    [sw11 @, ks.pkw, @.1 ||| noop]
                                                    [movbi.3.b @, 0x1FF ||| rev.b @, @.1]
                                                    [xor.3.w @, @.3, Bnc ||| xor.2.w ks.pkw, @.3, @.1]
                                                    [in (untyped) ks.pkhfRegLink, reg_vsp_link ||| sh.w ks.newB,
// Restore reg_vsp_link and p0 (carry over from     ks.pkw, 1]
krnSaveSmem()).                                     [and.3.w ks.pkw, @.3, ks.newB ||| add.2.w ks.pkwPtr,
// Store ks.newB into this thread's TCB.            (untyped)
// Return to caller.                                    krn.wCurrentContextPtr, 0]
[add.3.w @.3, (untyped) krn.tdCurrent.wThread,      [call krnSaveSmem ||| noop]
memberofiset(TCB, wBitmask)
  ||| out reg_vsp_link, (untyped) ks.pkhfRegLink    // Restore reg_vsp_link and p0 (carry over from
[out reg_vsp_ptr3_all, (untyped) ks.regs.w_p3_all;  krnSaveSmem()).
st (@.3), ks.newB, sizeof(word) - 1]
[jmp reg_vsp_link ||| noop]
} fragment _xosSetSmemConstants()
{
// Requires:  Interrupts are turned off.
//            ks.pkw (bitmask that needs reversing and negating)
//
```

A1-12

APPENDIX A

// Return to caller, being careful that there's enough latency
for the IO.
[out reg_vsp_link, (untyped) ks.pkhfRegLink;
 out reg_vsp_ptr3_all, (untyped) ks.regs.w_p3_all]
[noop;
 jmp reg_vsp_link]
} fragment_xosSetICacheSize()
{
// Requires: Interrupts are turned off.
//           ks.pkw
//
// Modifies: reg_vsp_tagctl set noild;
deletepool;
set nooptimize;

// Hack overlay code into ks.hfCode0 and ks.hfCode1.
// v17 [noop; noop] [noop; jmpr] is [0x1c0e0 0 0 0] [0x198e0 0 0 0].
[movbi.3.h ks.hfCode0, 0 ||| movbi.1.h ks.hfCode1, 0]
[movhi.3.h @, 0x1c0e0 ||| movhi.1.h @, 0x198e0]
[ins.h ks.hfCode0, @,3, 6;
 ins.h ks.hfCode1, @,1, 6]

// Assume 3 bits for code window base are in
krn.hLast256KB >> 1

// (proper for tagctl). Assume b1-b0 need to be cleared
before adding
// (or'ing) the caller's parameter.
// Jump to overlay code and change icache size.
[exp.h @,1, krn.hLast256KB, offsetof(krn.hLast256KB);
 sh.h @,1, @,1, -1]
[and.2.b @,2, @,1, 0x1FC;
 add.2.b @,2, @,2, (untyped) ks.pkw]
[jmp (0x1FF000 + (DEF_ISR_START - SIZEOF_ALUS) *
8 +
memberoffset(struct_KS, hfCode0)) ||| out reg_vsp_tagctl,
@,2]
} fragment_xosSetDataSegment()
{
// Requires: Interrupts are turned off.
//           ks.pkw is the new data segment ID.
//
// Modifies: ks.pkwPtr
//           (TCB *)(krn.tdCurrent.wThread)->wDataSegID
//           reg_vsp_database set noild;
deletepool;
set nooptimize;

// Compute address of (TCB *)(krn.tdCurrent.wThread)-
>wDataSegID.
// Load data pointer from lower word in RDRAM address.

A1-13

APPENDIX A

```
[add.3.w @, (untyped) krn.tdCurrent.wThread,
  memberoffset(TCB,
  wDataSegID) ||| ld ks.pkwPtr, ((untyped) ks.pkw), 3]

// Store ID (ks.pkw) to (TCB *)(krn.tdCurrent.wThread)-
>wDataSegID.
[st (@.3), (untyped) ks.pkw, 3 ||| noop]

// Return.
// Change reg_vsp_database to new value.
[jmp reg_vsp_link ||| out reg_vsp_database, (untyped)
ks.pkwPtr]
} fragment _xosJmpFar()
{
// Requires:   Interrupts are turned off.
//             ks.pkw is the new code segment ID.
//             ks.pkwCnt is the code offset destination.
//
// Modifies:   ks.pkwPtr
//             (TCB *)(krn.tdCurrent.wThread)->wCodeSegID
//             reg_vsp_codebase
//             reg_vsp_link
// set noild;
deletepool;
set nooptimize;
```

```
// Compute address of (TCB *)(krn.tdCurrent.wThread)-
>wCodeSegID.
// Load data pointer from lower word in RDRAM address.
[add.3.w @, (untyped) krn.tdCurrent.wThread,
  memberoffset(TCB,
  wCodeSegID) ||| ld ks.pkwPtr, ((untyped) ks.pkw), 3]

// Modify reg_vsp_link to new destination.
// Change reg_vsp_database to new value (tricky timing
here!).
// Store ID (ks.pkw) to (TCB *)(krn.tdCurrent.wThread)-
>wDataSegID.
// Return and enable interrupts.
[out reg_vsp_link, (untyped) ks.pkwCnt;
out reg_vsp_codebase, (untyped) ks.pkwPtr]
[st (@.3), (untyped) ks.pkw, 3 ||| noop]
[jmp reg_vsp_link ||| inten]
} fragment _xosCallFar()
{
// Requires:   Interrupts are turned off.
//             ks.pkw is the new code segment ID.
//             ks.pkwCnt is the code offset destination.
//
// Modifies:   ks.pkwPtr
//             ks.pkwIO[0]
//             (TCB *)(krn.tdCurrent.wThread)->wCodeSegID
//             reg_vsp_codebase
//             reg_vsp_link
//
```

A1-14

APPENDIX A

```
set noild;
deletepool;
set nooptimize;

// @.3 = (TCB *)(krn.tdCurrent.wThread)->wCodeSegID.
// Save reg_vsp_link to ks.pkhfRegLink.
[add.3.w @, (untyped) krn.tdCurrent.wThread,
memberoffset(TCB,
   wCodeSegID) ||| in (untyped) ks.pkhfRegLink,
reg_vsp_link]

// Load data pointer from lower word in RDRAM address.
// Modify reg_vsp_link to new destination.
[ld ks.pkwPtr, ((untyped) ks.pkw), 3 ;
out reg_vsp_link, (untyped) ks.pkwCnt]

// Change reg_vsp_database to new value (tricky timing
here!).
// Store ID (ks.pkw) to (TCB *)(krn.tdCurrent.wThread)-
>wDataSegID.
// Enable interrupts.
// Return.
[out reg_vsp_codebase, (untyped) ks.pkwPtr ||| exp.w @,
ks.pkhfRegLink, 0]
[st (@.3), (untyped) ks.pkw, 3 ||| inten]
[jmp reg_vsp_link ||| out reg_vsp_link, @.1]
} fragment _xosSetThreadSignalJumpback()
{
// Requires: Interrupts are turned off.
//           ks.pkw has the jumpback address.

set noild;
deletepool;
set nooptimize;

// Compute address of (TCB *)(krn.tdCurrent.wThread)-
>hfJumpback.
// Return and store jumpback point in TCB.
[add.3.w @, (untyped) krn.tdCurrent.wThread,
memberoffset(TCB, hfJumpback)
   ||| noop]
[jmp reg_vsp_link ||| st (@.3), ks.pkw, 1]
}

//--------------- End of Scheduler Functions ---------------
//--------- core thread allocation:

VSPError RMTThread::Allocate(void)
{
     VSPError  err;
     KREGS     kregs;
     ULONG     address;
     int       segno;

err = RMResourceOwner::Allocate();
     XREQUIRENOT( err, End );
```

A1-15

APPENDIX A

```
err = gKernel->AllocateThreadTCB( &fRMId );  // this
classes RMId is the kernel's TCB for the thread.
XREQUIRENOT( err, End );

err = gRAMMgr->AllocFixedSegment( &fCtxt, (DWORD)
VSPSizeof(VSPDWord)*SAVED_CONTEXT_SIZE );
XREQUIRENOT( err, End );

// ReadVSPStruct( &tcb, RMIdToHostPtr(fRMId),
sizeof(H_TCB));
fTCB.tlnk.wTLD      = (LONG) 0;
fTCB.tlnk.wNextLnk  = (LONG) 0;
fTCB.tlnk.wPrevLnk  = (LONG) 0;
// fTCB.tlnk.wDeadline = set in constructor
fTCB.wCodeSegID    = ( !fForceFixed ) ?
RMIdToVSPPtr(((RMId) fSegList[ fBaseCode ])) :
                                  RMOffsetToVSPPtr(
XOSAddrToOffset(NULLHANDLE_ADDR),
                              TRUE );
fTCB.wDataSegID    = ( !fForceFixed ) ?
RMIdToVSPPtr(((RMId) fSegList[ fBaseData ])) :
                                  RMOffsetToVSPPtr(
XOSAddrToOffset(NULLHANDLE_ADDR),
                              TRUE );
fTCB.wContextPtr   = RMOffsetToVSPPtr( fCtxt, TRUE );
fTCB.hfSignals     = 0;
fTCB.hfJumpback    = WAIT_RETURN;
fTCB.hfTimeoutSignals = 0;
// fTCB.hfSignalMask  = set in constructor
// fTCB.wBitmask      = set in constructor
// fTCB.wConstants    = set in constructor
// fTCB.wSlack        = set in constructor WriteVSPStruct( RMIdToHostPtr(fRMId), &fTCB,
sizeof(fTCB));

if (!bfiSymInfo( fBfiOutput, ((fEntryName) ? fEntryName :
"main"),
                  &address, NULL, NULL, NULL, (int *) &segno,
NULL ))
{
    err = kRMErr_No_Entry_Point;
    goto End;
}

XREQUIRE_ACTION(((DWORD)segno) == fBaseCode,
End, err = kRMErr_No_Entry_Point; );

kregs.hf_intlink = address >> 3; // primary entry point kregs.hf_tagctl = fIcacheMode + (((gRDRAMSize -
1)/(1024*1024*2)) << 2);
                                // set icache mode and map if (!bfiSymInfo( gKernel->GetSymbolTree(),
"_HaltThisThread",
```

A1-16

APPENDIX A

```
              &address, NULL, NULL, NULL, (int *) &segno,
NULL )) {         // lookup _HaltThisThread function in
kernel...
        err = kRMErr_Krn_Link_Failed;
        goto Fnd;
    } kregs.hf_link = address >> 3;

kregs.hf_vc1 = 0;
    kregs.hf_vc2 = 0;
    kregs.hf_rop= 0;
    kregs.hf_offset = 0;
    kregs.hf_round = 0;
    kregs.hf_repcnt = 0;
    kregs.hf_idct = 0;
    kregs.w_repaddr = (LONG) 0L;
    kregs.w_lfsr = (LONG) 0L;
    kregs.w_guard = (LONG) 0L;
    kregs.w_p0_all = (LONG) 0L;
    kregs.w_p1_all = (LONG) 0L;
    kregs.w_p2_all = (LONG) 0L;
    kregs.w_p3_all = (LONG) 0L;
//------------------------------------

// Set up ALU state (use ks)------------
    kregs.alus.pkwAlu1 = (LONG) 0L;
    kregs.alus.pkwAluM = (LONG) 0L;
    kregs.alus.pkwAlu2 = (LONG) 0L;
    kregs.alus.pkwAlu3 = (LONG) 0L;
    kregs.alus.pkwAluQ = (LONG) 0L;
    kregs.pkwAge = (LONG) 0L;

WriteVSPStruct(
RMOffsetToHostPtr(fCtxt+(MAX_DATA_SIZE*VSPSizeof(
VSPDWord))), &kregs, sizeof(kregs));

if ( gDebuggerPresent )
        NotifyBfiDebugger( OffsetOfId(fRMId), OffsetOfId(
fCtxt ) );

End:
    if ( err )
    {
        DeleteSegments();
        if ( fRMId != kBadRMId ) gKernel-
>FreeThreadTCB( fRMId );
    } return err;
}
```

A1-17

APPENDIX A it calls:

//------

```
VSPError RMResourceOwner::Allocate()
{
    VSPError    err = NO_ERROR;
    RMOffset    newp;
    ULONG       i;
    DWORD       whichClass;

err = gPlatMgr->DegradeResources( this );
    XREQUIRENOT( err, End );

for( i = 0; i < fSegListSize; i++ )
    {
        if ( fSegList[i] == kBadRMId ) continue;

whichClass = kRMFixedClass;

if ( (fSegList[i] & kRMIdCodeMask) && !(fSegList[i] &
kRMIdFixedMask))
        {
            err = gRAMMgr->AllocRelSegment( &newp,
(DWORD) OffsetOfId(fSegList[i]), FALSE );
            whichClass = kRMRelCodeClass;
        } else if ( !(fSegList[i] & kRMIdFixedMask))
        {
            err = gRAMMgr->AllocRelSegment( &newp,
(DWORD) OffsetOfId(fSegList[i]), TRUE );
            whichClass = kRMRelDataClass;
        } else if ( fSegList[i] & kRMIdAbsMask ) {
            newp = fTempList[i];
            if ( fSegList[i] & kRMIdCodeMask )
                newp += gCodeWindowBase;
            err = gRAMMgr->AllocAbsoluteSegment( newp,
(DWORD) OffsetOfId(fSegList[i]) );
        } else
        {
            err = gRAMMgr->AllocFixedSegment( &newp,
(DWORD) OffsetOfId(fSegList[i]));
        }
        XREQUIRENOT( err, End );

fSegList[i] = MakeRMId( newp, (fSegList[i] &
~kRMIdOffsetMask) | RMClassToFlag(whichClass));
    } if ( !bfiSegInfo( fBfiOutput, cCommitSeg, this ))
    {
        err = BFIERRNO( fBfiOutput );
        goto End;
    }
```

A1-18

APPENDIX A

```
if (!bfiResolve(fBfiOutput))
{
    err = kRMErr_Link_Failed;
    goto End;
} if (!bfiDownLoad( fBfiOutput, cWriteRDRAM,
cDoNothing, (void *) this )) {
    err = kRMErr_Out_Of_VSPMem;
    goto End;
} fIsAllocated = TRUE;

End:
    if ( err )
    {
        DeleteSegments();
    } return err;
}
```

A1-19

I claim:

1. A method of fast context switching on a data processing system including a processor, backing store, temporary storage, and a shared system resource, the processor being coupled to the backing store, the temporary storage, and the shared system resource, the method comprising the steps of:

executing a current task on the processor;

utilizing a shared system resource for storing a designated component of information of the current task;

maintaining a map data structure accessible by the processor and containing utilization data of the shared system resource of the current task;

preparing to execute an incoming task on the processor;

loading into temporary storage the shared system resource utilization of the current task;

loading into temporary storage a projected shared system resource utilization of the incoming task;

accessing the map data structure to determine available portions of the shared system resource;

comparing the shared system resources of the current task and available portions of the shared system resource to projected utilization of the shared system resource of the incoming task; and swapping to the backing store only those portions of the shared system resource utilized by the current task necessary to accommodate projected shared system resource utilization of the incoming task.

2. The method of claim 1 wherein the step of maintaining a map data structure comprises:

maintaining a map data structure for a shared system resource including a register file utilized; and utilizing the processor to store and access task information in the register file, the processor further including instructions to retrieve and store the information from the register file.

3. The method of claim 1 further comprising the steps of:

updating the shared system resource map data structure to indicate that the current task utilization of a portion of the shared system resource is read only data; and checking the shared system resource map and only swapping the information contained within the shared system resource the first time the current task is disengaged from the processor.

4. The method of claim 2 wherein the processor further comprises:

instructions to store and retrieve information from a plurality of registers in the register file in a single processor instruction.

5. A system for fast context switching on a processing system comprising:

a data processing system including a processor, backing store, temporary storage, and a shared system resource, the processor being coupled to the backing store, the temporary storage, and the shared system resource;

a current task and an incoming task running on the processor capable of using the shared system resource during task processing, the current task being the task executing instructions on the processor, the incoming task being the task ready to execute instructions on the processor;

a system resource map data structure for tracking the utilization of the shared system resource;

a system routine for arbitrating the usage of the shared system resource, the system routine including:

means for loading into temporary storage the current task's shared system resource utilization;

means for loading into temporary storage the incoming task's projected shared system resource utilization;

means for accessing the map data structure to determine available portions of the shared system resource;

means for comparing the current task's shared system resources and the available portions of the shared system resource to the incoming task's projected utilization of the shared system resource; and means for swapping to the backing store only those portions of the shared system resource utilized by the current task necessary to accommodate the incoming task's projected shared system resource utilization.

6. The system of claim 5 further comprising:

a shared system resource which is a register file including more than one register utilized by the current and incoming tasks for storing and accessing task information; and a processor including instructions to retrieve and store the task information from the register file.

7. The system of claim 6 wherein the processor further comprises:

at least one instruction capable of moving data from the register file to the backing store more than one register at a time.

8. The system of claim 6 further comprising:

task information which is task code or task data.

9. The system of claim 5 wherein the system routine further comprises:

instructions for updating the shared system resource map data structure to indicate that the current task utilization of a portion of the shared system resource is read only data which only needs to be swapped the first time the current task is disengaged from the processor.

* * * * *